Dec. 16, 1969 ZEN'ITI KIYASU ET AL 3,484,779

CODERS

Filed May 17, 1966 3 Sheets-Sheet 1

INVENTER
Masao KAWASHIMA
et al

CODERS

Filed May 17, 1966 3 Sheets-Sheet 3

United States Patent Office 3,484,779

Patented Dec. 16, 1969

3,484,779

CODERS

Zen'iti Kiyasu, Sendai-shi, and Masao Kawashima, Yokohama, Japan, assignors to Fujitsu Limited, Kawasaki-shi, Kanagawa-ken, Japan Filed May 17, 1966, Ser. No. 550,691
Claims priority, application Japan, May 18, 1965, 40/29,176
Int. Cl. H04l *3/00;* H03k *13/00*
U.S. Cl. 340—347 5 Claims

ABSTRACT OF THE DISCLOSURE

A high speed coder is disclosed which converts a sampled analog signal into a reflected binary code. The coder employs all solid state components and relies on the symmetries of the reflected binary code to affect the conversion. A series of polarity discriminators provide outputs corresponding to respective bits of the code, and each discriminator after the first is connected to the input by signal processing circuitry which performs the functions of rectification, biasing, and amplification and phase inversion or attenuation depending on the application.

BACKGROUND OF THE INVENTION

Field of the invention

This invention relates to improvements in and relating to coders which are broadly in use presently, for instance, in the field of pulse modulated communication, telemetering techniques and the like, for performing analogue-digital signal conversion.

DESCRIPTION OF THE PRIOR ART

Representative coders of the above kind, such as for example the feedback comparative system, the counting system, the coding tube system and the like are commonly known. Of these the coding tube system is most adapted for high speed coding. This system, however, relies upon electron beams, which necessitates inevitably the use of hot-cathodes for thermionic emission, on the one hand, and the use of a high voltage source for the acceleration of the electrons, on the other hand. A vital drawback inherent in the coding tube system is its highly limited durable life.

BRIEF DESCRIPTION OF THE INVENTION

It is therefore the main object of the present invention to provide coders of the kind above referred to, capable of performing a high speed coding operation without relying upon vacuum electron tubes, but relying exclusively upon solid electronic elements such as transistors, solid diodes and the like.

A further object of the invention is to provide coders of the nature above referred to, which obviate the use of a high voltage source.

It is a still further object of the invention to provide such coders as capable of performing unsymmetrical coding operation without relying upon conventional compandors.

These and further objects, features and advantages of the invention will become more clear as the description proceeds.

The invention has been derived from precise observation of the nature of the reflected binary code system. Although binary codes are generally employed in the pulse code modulation technique, it is obvious that when the coding operation is carried out at higher speed and in a simpler manner by employing both regular binary coding and reflected binary or gray coding systems, the desired coding operation will be attained.

BRIEF DESCRIPTION OF THE DRAWINGS

The present invention will be described further by way of example with reference to several preferred embodiments as illustrated in the accompanying drawings in which.

DETAILED DESCRIPTION OF THE INVENTION

Figure 1:
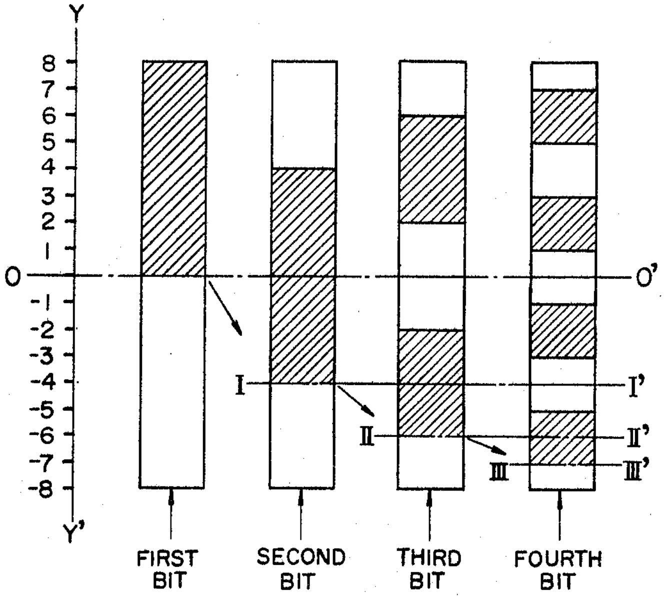
FIG. 1 is an explanatory diagram illustrative of the basic principles upon which the invention is founded.

In the following detailed description, it is assumed that the signals to be coded have no dc components and the number of bits is four. It will be appreciated by those skilled in the art, however, that other cases can be easily derived from the specific knowledge of the specific embodiments to be set forth.

In the diagram shown in FIG. 1, the divided signal levels from +8 . . . 0 . . . −8 are represented by reflected binary codes as follows:

| Signal level: | Binary codes |
|---|---|
| +7 . . . +8 | 1 0 0 0 |
| +6 . . . +7 | 1 0 0 1 |
| +5 . . . +6 | 1 0 1 1 |
| +4 . . . +5 | 1 0 1 0 |
| +3 . . . +4 | 1 1 1 0 |
| +2 . . . +3 | 1 1 1 1 |
| +1 . . . +2 | 1 1 0 1 |
| 0 . . . +1 | 1 1 0 0 |
| −1 . . . 0 | 0 1 0 0 |
| −2 . . . −1 | 0 1 0 1 |
| −3 . . . −2 | 0 1 1 1 |
| −4 . . . −3 | 0 1 1 0 |
| −5 . . . −4 | 0 0 1 0 |
| −6 . . . −5 | 0 0 1 1 |
| −7 . . . −6 | 0 0 0 1 |
| −8 . . . −7 | 0 0 0 0 |

In this pattern diagram, the axis of ordinates Y–Y′ represents levels of analogue input signals subjected to sampling.

In this case, as shown, these levels are defined by plus and minus eight stages by way of example. In this pattern diagram, shaded areas define "1" of binary codes, while non-shaded areas define "0" thereof. The horizontal and central axis expressed by a chain line O–O′ defines the boundary between the positive and negative regions of the pattern. It will be easily seen from the foregoing that the first bit represents the plus or minus sign of each of the sampled signals, while the second, third and fourth bits represent the figures showing in combination the level of input elemental signal. As above assumed, the elemental signals to be treated are deficient of D.C. component, the positive and negative figures of the signals appear in a symmetrical order, when a large number of signals are statically observed and as clearly seen at a glance to the pattern diagram of FIG. 1. In the similar way, the second and further succeeding bits are symmetrical on the pattern diagram about an axis I–I′, which means that these bits, upon subjected to sign-descrimmination, can be treated in connection with their absolute figures only. When relying upon this observation, it is enough for the attainment of the desired coding purpose basically to observe those parts of the second and further bits which are positioned below the axis O–O′ on the pattern diagram. When observing further the second bit column at its lower half part below the central axis O–O′, it will be found in connection with the second bit area that a similar relation exists between this area and the secondary axis I–I′ as in the case of the first bit column relative to the central or primary axis O–O′. Or more specifically, the nature as observed with relation to the lower half of the second bit column is such as to be as if the second bits belonging to the upper area above the secondary axis I–I′ were positive and those belonging to the lower area below the same axis were negative. The only difference between the two may be considered to be a shifting of primary axis O–O′ to secondary axis I–I′. Thus, if there is provided an organ for the discrimination of the polarity of the sign of a bit, the sign of the first bit in each case can be definitely determined. As for the second bit, when the input signal is rectified and subjected to phase inversion, the desired negative pulse can be obtained. This procedure corresponding a fold-over of the upper area of the second bit column about the primary axis O–O′ in FIG. 1. When the thus folded-over pulses are discriminated their upper or lower position in each case relative to secondary axis I–I′, the second bit can be definitely determined. The discrimination of position of bit about the secondary axis corresponds, when expressed in terms of manipulation, to an impressing a bias equal to a half of the maximum amplitude, so as to shift the primary axis O–O′ to the scheduled position of secondary axis I–I′. As for the third bits and further succeeding bits, the same principle may equally apply and similar procedures can be adopted.

Figure 2:
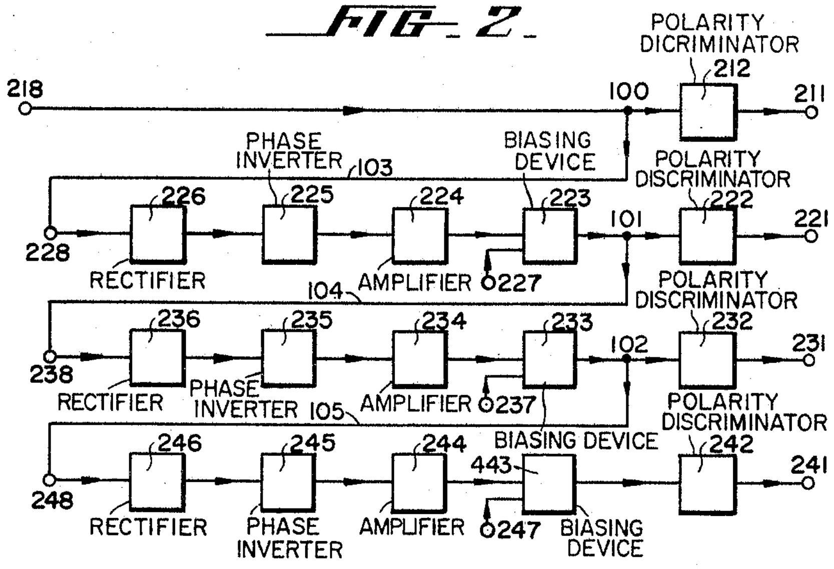
FIGS. 2 and 3 are block diagrams of two different embodiments of the invention.

For the realization of the aforementioned principles of the present invention in an electronic way, a preferred embodiment shown in FIG. 2 can be employed. This arrangement has been designed for 4-bit mode as already described.

In FIG. 2, numeral 218 denotes input terminal to which a successive series of voltage signals are supplied which can be resolved to signal levels −8 to +8, as already mentioned. Numerals 211, 221, 231 and 241 denote four output terminals for the first, second, third and fourth bit-making stages electrically connected one after another, respectively. Output signal bits are practically simultaneously delivered from these output terminals, as will be easily understood as the description proceeds. Numerals 228, 238 and 248 represent input terminals to said second, third and fourth stages. Further numerals 212, 222, 232 and 242 represent polarity discriminators for said four successive stages, and electrically connected to said four output terminals, respectively, and so designed as to deliver a specific output pulse depending upon the polarity of the fed signal, preferably "1" when the signal is positive and "0" when the signal is negative. Numeral 223, 233 and 243 represent schematically biasing devices, the inputs thereof being connected to the outputs of amplifiers and the outputs thereof being connected to the input of said discriminators 222, 232 and 242, respectively.

Terminals 227, 237 and 247 act as input terminals for reception of biasing signals from respective sources, not shown, and connected to respective biasing devices 223, 233 243, respectively, for delivering the received signals to the inputs thereof. The amplifiers 224, 234 and 244 are arranged for reception of output signals from respective phase inverters 225, 235 and 245 and for amplifying the received signals without inverting their phase, in the order of 6 db, for instance. Rectifiers 226, 236 and 246 are inserted between respective input terminals 228, 238 and 248 and respective phase inverters 225, 235 and 245, for passing input signals of positive polarity therethrough, without affecting the polarity, while inverting the polarity of any of the received signals, when they are of negative polarity. Biasing devices 227, 237 and 247 and their related biasing signal sources are so designed and arranged that a biasing signal corresponding to the maximum amplitude is thereby applied respectively.

As already mentioned, the analog signal to be treated is sampled into elemental signal pulses ranging from −8 level to +8 level, by way of example in this case, which are successively supplied to input terminal 218. The sampled signal is subjected to polarity discrimination in discriminator 212 and then fed as a first bit through the output terminal 211.

On the other hand, part of the input signal to discriminator 212 is supplied through junction point 100 and conductor 103 to the input terminal 228 of the second stage, rectified at 226, phase-inverted at 225, amplified at doubler 224, subjected to biasing processing at 223, discriminated as to polarity at 222, and finally delivered as the second bit through output terminal at 221.

Part of the input to the discriminator 222 in the second stage is conveyed through junction 101 and conductor 104 to the input terminal 238 of the third stage and processed in the similar way at 236, 235, 234, 233 and 232 and supplied as the third bit to the output terminal 231, thence to an outside reception or processing device, not shown.

Part of input to the discriminator 232 of the third stage is conveyed in the similar manner through junction 102 and conductor 105 to the input terminal of the fourth stage, and the processed similarly at 246, 245, 244, 243 and 242. Finally, the thus processed signal is delivered as the fourth bit through output terminal 241 to an outside reception device as above.

In the foregoing, the arrangement has been shown and described somewhat in an idealized manner for a better understanding of the invention. In practice, each of said amplifiers may include therein means for phase inversion. In such case, phase inverters 225, 235 and 245 may be dispensed with.

The amplifying factor of amplifier 224 inserted between input terminal 228 to the input of discriminator 222 of the second stage must be determined in consideration of possible losses at 226, 225 and 223 and possible distribution loss at the inlet of discriminator 222, with the maximum amplitude level of the second bit equal to that of the first bit, by compensating these possible losses. This measure must also be taken into account with reference to the respective amplifiers 234 and 244 in the third and fourth stages.

Caution must be taken for the selection of the degree of bias at 223, 233 and 243, respectively, so as to arrange and adjust these devices for obtaining proper signal levels corresponding the axes I–I′, II–II′ and III–III′, respectively, shown in FIG. 1.

The appliances for sampling the analog signal to be treated and impressed to input terminal 218 of the first stage may be any of the conventional arrangements commonly used in this field. The output bits delivered from output terminals 221, 231 and 241, respectively, can be stored, when desired temporarily in suitable devices such as registers. These stored pulses may be delivered simultaneously in parallel, or in series and in a predetermined successive order. In the latter case, shift registers as commonly known to those skilled in the art may be utilized. If the delivered output signals in the form of reflected binary codes should not meet the local demands on account of considerable difficulties in the treatment of the signals, they can be converted into corresponding natural or regular binary codes in a simple manner, as is commonly known, relying upon various conventional circuit means now broadly in use in this field of engineering.

In the arrangement shown in FIG. 2, the first stage only is peculiar and the remaining three stages represent each a similar circuit arrangement. If, instead of 4-bit code, it is desired to arrange the whole system in $n$-bit code $n$−1 stages similar to these latter stages may be employed and connected one after another, in a, so to speak, expanded manner from the arrangement shown in FIG. 2, while the first stage is kept unchanged as before.

As will be easily seen from the foregoing that the aforementioned embodiment of the present invention does not require highly complicated discriminating means such as those frequently used in the feedback comparating system, and is not fitted with feedback loops. The first, second and the like bits are decided in parallel to each other. Therefore, any possible and considerable hindrance against the desired high speed coding operation is that delay in signal transmission, when described in connection with FIG. 2, from input terminal at 218 through 228, 238, 248 and the like. For instance, the rectifiers 226 and the like can be designed in the form of high speed tunnel diodes, and thus the delay caused thereby can be reduced to a negligibly small value. On the other hand, since the gain of each of the amplifiers 224 and the like can be selected to be in the order of 6 db, as already referred to, those amplifier elements which have higher gain-bandwidth product can be employed without hindrance, thereby high frequency band amplifying being effectively realized. Thus, the possible time lag by the amplifiers is also small and acceptable.

On the other hand, linear circuits can be employed as the biasing devices with negligibly small time lag. As an example, when the amplifier is designed to have a bandwidth of 200 mc., the possible time lag caused by the amplifier will amount to only several nano seconds. Time delay caused by the provision of diodes can be selected to be in the order of 1 nanosecond, the time difference between successive bits may be thus in the order of only several nanoseconds. In this case, therefore, the coding operation can be carried out with a pulse frequency in the order of 200 mc. When the amplifiers are designed to have a bandwidth of 500 mc., the coding operation at a pulse frequency in the order of again 500 mc. can be realized. As exemplified by these numerical examples, a remarkably high speed coding can be realized according to the principles of the present invention which means a remarkable progress in the art.

In order to further accelerate the coding operation, several amplifiers shown in FIG. 2 may be dispensed with, and the bias may be selected at the second stage to be ½ the maximum amplitude, at the third stage to be ¼; and at the fourth or final stage to be ⅛. By adopting this kind of alternative measure, the desired high speed coding operation can also be realized. In this case, however, the sensitivity of the sign discriminator must be doubled, quadrupled and so on, at the second, third and fourth stage. If difficulties should be encountered by such sensitivity-multiplication, attenuators may instead be employed, so as to make every output bit pulses from all the processing stages substantially at the constant level, as will be later described herein with reference to FIG. 3. With such modified arrangement, when employed, having been fitted without amplifiers, the main cause for the time lag will be that provided substantially by the rectifiers. As for rectifiers, owing to the recent development of tunnel diodes, it is possible to set the time lag to a nanosecond or less. Therefore, when relying upon this kind of advanced, yet conventional technique, a coding operation of the order of 1000 mc. pulse frequency may be realized by adopting the novel teaching according to this invention.

Prior high speed coders are fitted almost exclusively with electron beam tubes which may provide a maximum pulse frequency of about 250 mc. As already described that according to this invention, not only high speed coders equivalent to the electron beam tube coder, but also still more speedy and efficient coders having at least several times higher operating performance can be realized. In addition, still further improved coders can be realized when the latest, advanced technique of rectifiers is fully utilized. It may be clearly seen from the foregoing that the arrangement for desired coding comprises any selected number of stages or unit circuits, and therefore highly suitable for the manufacture of solid or integrated circuit assemblies.

In the foregoing, the description has been directed to so-called linear coders. In addition, however, non-linear coders can also be realized according to the principles of the invention. For instance, by shifting the subsidiary axes I–I′, II–II′ and III–III′ shown in FIG. 1 to certain respective positions so as to meet specific demands, non-linear coders are realized. When this measure is described in connection with the arrangement shown in FIG. 2, it means that the strength of the biasing signal applied to biasing input terminals 227, 237 and 247 is varied according to the requirement. Thus, according to the invention, non-linear coders may be realized without the use of conventional specific compandors, which means a considerable progress in the art.

Although phase inverters 225, 235 and 245 are employed in the arrangement shown in FIG. 2, this is mainly for the purpose of description with reference to the pattern diagram shown in FIG. 1. If desired, however, these inverters may be dispensed with, by adopting such measures as shifting the subsidiary axes I–I′, II–II′ and III–III′ to symmetrical positions relative to the central axis O–O′ in connection with the pattern diagram of FIG. 1. In this modified arrangement, however, the second, third and fourth bits will be delivered in the form of complementary codes. Since there are known various highly conventional means for converting complementary codes back into the corresponding regular codes, the above-mentioned modification would be more convenient in practice when occasion demands to do so.

In another modification, the arrangement is such that the first bit only is converted into its corresponding complementary code, and then all the bits are processed as a whole to restore the original codes.

Next, referring to FIG. 3, a further modified coder arrangement will be described. This modification corresponds to that wherein the subsidiary axes I–I″ II–II′ and III–III′ have been shifted symmetrically relative to the central axis O–O′ and above the latter, when observed in the pattern diagram of FIG. 1. In this modification, therefore, phase inverters are not necessary to be fitted, as was already hinted hereinbefore.

In this figure, numeral 318 denotes input terminal similar to 218 in the foregoing embodiment, while numerals 314, 324, 334 and 344 represent output terminals of the first, second, third and fourth stages of the modified coder for the delivery of respective bits as before. Numerals 311, 321, 331 and 341 denote respective sign discriminators, similar to those denoted respectively by 212, 222, 232 and 242 in the foregoing embodiment, for the generation of polarity-discriminating signals from the supplied respective bit signals. Numerals 323, 333 and 343 denote biasing devices attributed to the second, third and fourth processing stages, respectively, similar to those denoted by 223, 233 and 243 in FIG. 2. Input terminals 327, 337 and 347 correspond to those denoted by 227, 237 and 247 shown in FIG. 2, respectively. Numerals 326, 336 and 346 denotes respective rectifiers, while numerals 315, 325 and 335 denote attenuators provided, as shown, in the first, second, and third stages of the modified coder, for matching the processing signal voltages to the sensitivity of respective polarity of sign-discriminators 311, 321 and 331. In an idealized case wherein the rectifiers and the biasing devices provide no attenuation, the first stage attenuator 315 provides an attenuation factor of 18 db; the second attenuator 12 db; and the third stage attenuator 6 db. If there be attenuations in the respective rectifiers and biasing devices, these factors should naturally be taken into account.

Figure 3:
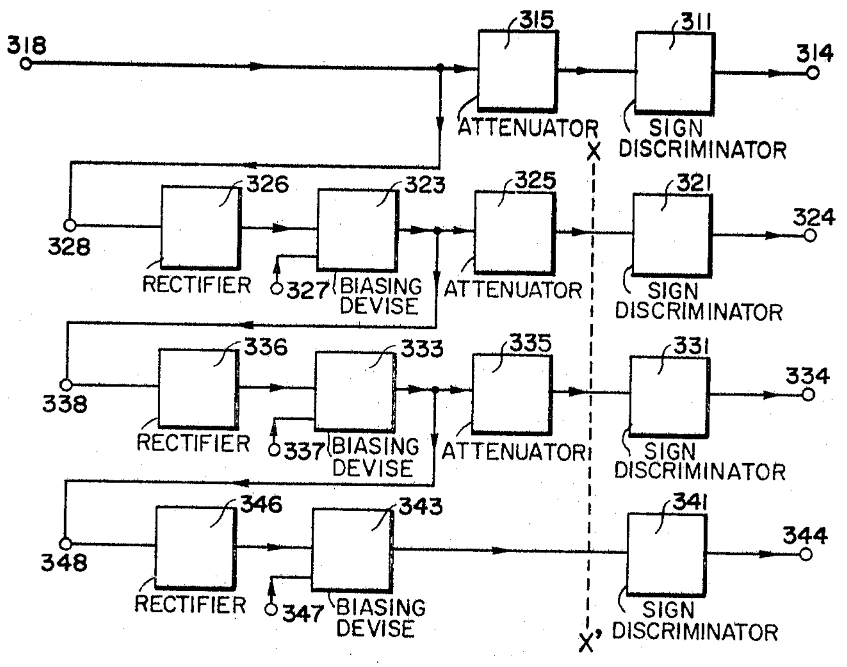

In the coder shown in FIG. 3, the left-hand part thereof from a vertical dotted line X–X′ comprises a unit and thus the advantages referred to hereinbefore in connection with FIG. 2, will apply naturally to hte present case.

Since several attenuators are provided in this modified embodiment shown in FIG. 3, the signal to be processed therein must have a considerably high level in comparison with the foregoing case. Therefore, it is generally recommended to perform sampling of the original analog signal after amplifying thereof to a proper signal level.

It is possible to exchange the position of the respective phase inverters with that of the related respective amplifiers shown in FIG. 2. A mixed arrangement of those illustrated in FIGS. 2 and 3 is also employable for the purpose intended. When the sampled signal elements to be supplied to the input terminal, as at 218 or 318, of the coder contains D.C. components, it is enough to regulate the biasing signals to be supplied, so as to compensate these components.

Figure 4:
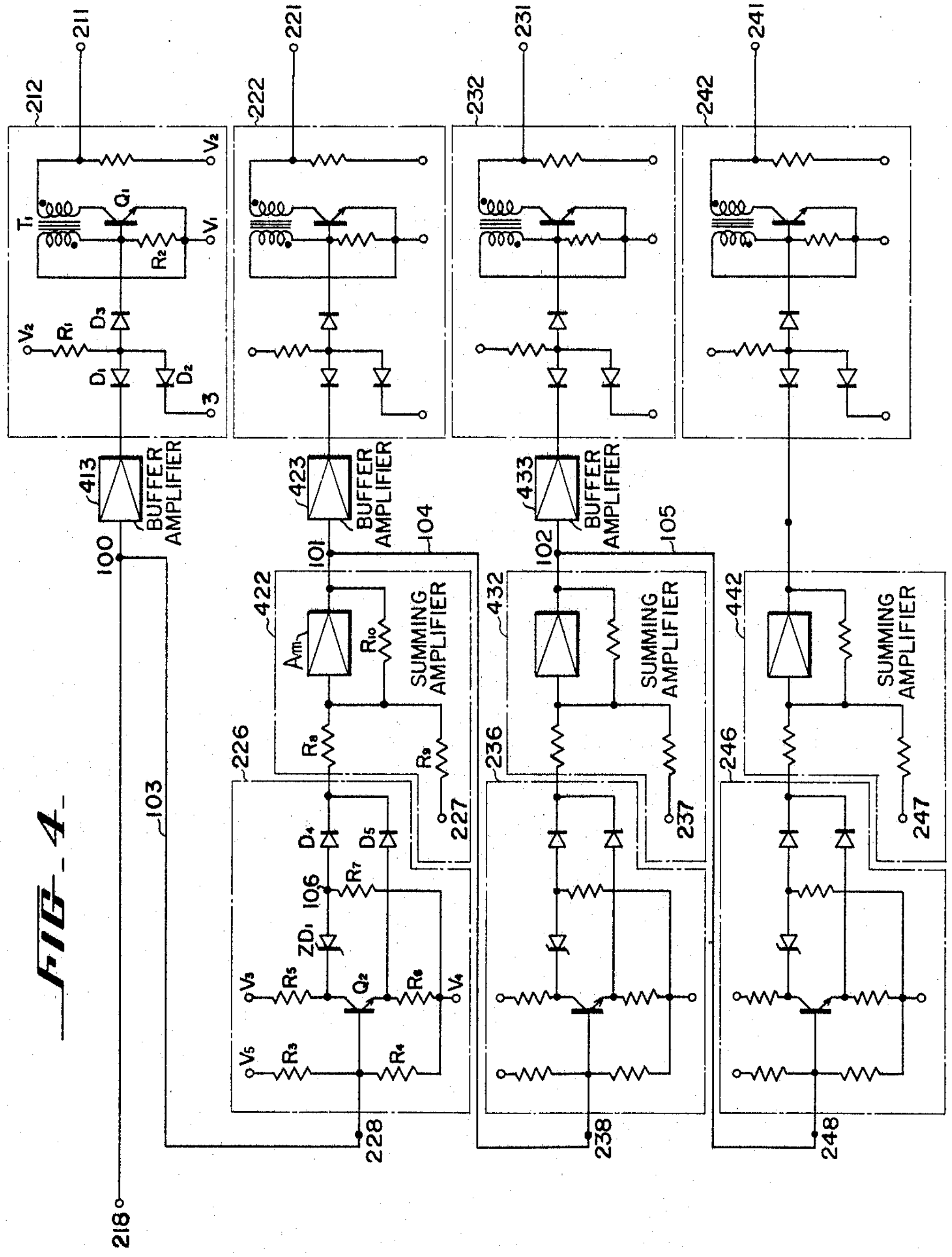
FIG. 4 is a circuit diagram of the first embodiment of the invention schematically and basically illustrated in FIG. 2.

A further embodiment of the present invention shown in FIG. 4 is based on the principle described hereinbefore with reference to FIGS. 1 and 2. In this embodiment, like substantial reference numerals denote identical structure with that used in the foregoing embodiment and therefore no further detailed description will be set forth herein. In the present embodiment, buffer amplifiers 413, 423 and 433 are added. In addition, several blocks shown in FIG. 2 are illustrated more in detail, while several blocks are united into one and the same block.

Figure 5:
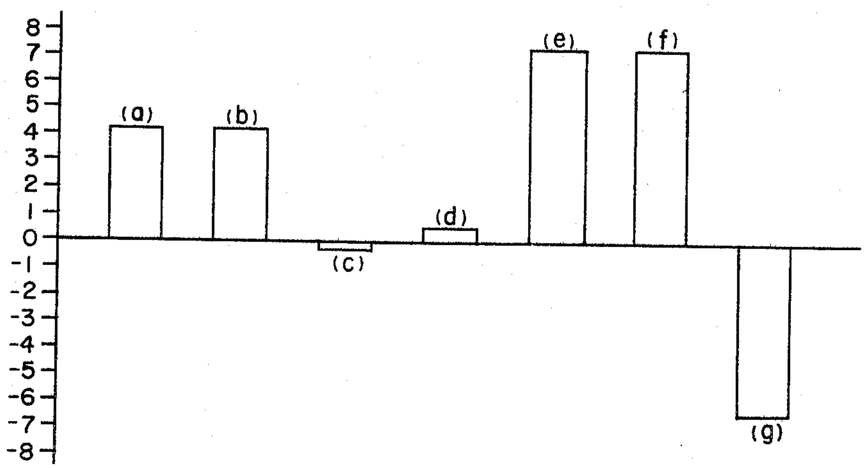
FIG. 5 is a diagram showing signal wave forms as appearing at several points of the circuit shown in FIG. 4.

For a better understanding the present embodiment, the construction thereof will be set forth hereinbelow simultaneously with the description of its function:

Now assuming, a sampling signal element having a level of +4.2 as measured in the pattern diagram shown in FIG. 1 is applied to the input terminal 218 of the present coder, the wave form of this signal element being illustrated in *a* of FIG. 5.

This signal element is then conveyed through junction point 100 and buffer amplifier to discriminator 212 in the form of a comparator as shown, so as to determine its plus or minus polarity, as was already referred to. This signal is assumed to be positive, and therefore will be delivered to output terminal 211, the thus delivered signal being therefore in the form of binary "1".

The discriminator or comparator 212 comprises an AND-gate including diodes $D_1$, $D_2$ and $D_3$ and resistor $R_1$; and a blocking oscillator including transistor $Q_1$, transformer $T_1$ and resistor $R_2$, and operates to deliver the said first bits under the control of a timing signal supplied through an input terminal 3, said timing signal pulses being selected to be in syncronism with the sampling pulses, as easily supposed by those skilled in the art. The threshold condition of this blocking oscillator is so selected that when a positive input signal pulse is received, the oscillator is energized to oscillate, by the proper selection of emitter voltage source $V_1$ for transistor $Q_1$.

At the same time, the input sampled signal element of the level +4.2 is fed through 100, 103 and 228 to rectifier circuit 226, as was already mentioned, which includes resistors $R_5$ and $R_6$ having a predetermined constant value. By this selection of both resistors $R_5$ and $R_6$, it is possible to obtain outputs of equal amplitudes, yet having reversed phase relation to each other, the emitter and collector electrodes of transistor $Q_2$ included in the rectifier circuit. The working point of this circuit is so designed and selected that the potential at the emitter of transistor $Q_2$ is equal to the input potential to a succeeding summing amplifier 422 which corresponds practically to a combination of three blocks 225, 224 and 223, shown in FIG. 2, by adjusting a voltage source at $+V_5$ and the ratio between resistors $R_3$ and $R_4$. In practice, for this purpose, the voltage drop at diode $D_5$ and that in the base-emitter passage must be taken into account. As seen, $V_3$ and $V_4$ are collector and emitter voltage sources for the transistor $Q_2$. The value of voltage source $+V_3$ is selected to attain the desired potential appearing at junction 106 between Zener diode $ZD_1$ and normal diode $D_4$.

Under these conditions, the supplied positive pulse, +4.2, to the input terminal 228, is subjected to no change in the rectifier circuit and supplied to summing amplifier, and because of that the application of the positive pulse to the base electrode of transistor $Q_2$ causes the emitter electrode thereof to be positive and thus the transistor is kept conductive, while diode $D_5$ becomes conductive so that the positive input pulse may be delivered with no alteration.

On the other hand, when a negative pulse is applied to the input terminal 228, transistor $Q_2$ is interrupted, while diode $D_4$ will become conductive. Therefore, the potential at junction 106 becomes positive and thus diode $D_5$ is cut off and a positive pulse will be delivered, as shown at *b* in FIG. 5.

This delivered pulse, having equally as before a level of +4.2, is supplied to summing amplifier 422 and processed therein so that it is added with a biasing signal having a level of −4, and subjected to a phase inversion as referred to hereinbefore, and finally doubled in its amplitude at the amplifier section Am which in this case performs the necessary phase-inversion, as was described hereinbefore with reference to phase inverter at 225, FIG. 2. The thus resulting signal will have the following level:

$$\{4.2+(-4)\}\times(-2)=-0.4$$

Thus, the output pulse from the circuit 422 has a level of −0.4, as illustrated at *c* in FIG. 5.

The summing amplifier 422 is a kind of operational one, the aforementioned amplifying factor being set by suitably selecting the values of resistors $R_8$, $R_9$, and $R_{10}$. In order to realize the aforementioned doubling amplification, the following formulas should be satisfied:

$$e_0=\frac{R_{10}}{R_8}e_1+\frac{R_{10}}{R_9}e_2$$

and $$e_0=2(e_1+e_2)$$

Therefore, $$R_8=R_9=\tfrac{1}{2}R_{10}$$

where, $e_0$ denotes the output signal level; $e_1$ and $e_2$ being input signal levels.

From the foregoing, it will be clear that the summing amplifier 422 performs the aforementioned three functions, or more specifically the phase-invertion, the doubling amplification and the biasing addition.

The thus processed signal, having a level of −0.4, is supplied through buffer amplifier 423 to sign discriminator 222 in the form of comparator, the construction and arrangement being similar to those of discriminator 212. By this addition of the negative pulse to the latter, no pulses will be delivered from output terminal 221, therefore representing in this case a binary "0".

On the other hand, the signal of the level −0.4 is supplied, as already mentioned, through 101, 104, 238 to the rectifier circuit 236 of the third stage and processed in the same way as in the second stage. Thus, the signal processed to a pulse having a level of +0.4, as illustrated at *d* in FIG. 5, is conveyed to summing amplifier 432 which is similar to that denoted by 422. Therefore, the output from the amplifier 432 will be:

$$0.4+(-4)\times(-2)=7.2$$

This output pulse is also illustrated at *e* in FIG. 5. This output is then delivered through buffer amplifier 433 to discriminator or comparator 232 which is similar to 211 and 222 as already mentioned. This application of the positive pulse will cause a pulse having a predetermined level to be delivered, which denotes a binary "1".

On the other hand, this signal of +7.2 is also delivered through 102, 105 and 248 to rectifier circuit 246 of the fourth stage, as was already referred to. This signal is not subjected to any alteration in this circuit, as shown at *f* in FIG. 5, which circuit is similar to those in the second and third stages. This signal of +7.2 is then supplied to summing amplifier 442 similar to those at 422 and 432 provided in the second and third stages, and processed in the similar manner, as was referred to. Therefore, the processed pulse will then be of such a signal level:

$$\{7.2+(-4)\}\times(-2)=-6.4$$

This processed signal is shown at *g* in FIG. 5. This signal is then supplied to discriminator or comparator 242 similar to those shown at 212, 222 and 232. The application of the negative pulse to this comparator will result in no pulse from the output terminal 241, which means a binary "0". Therefore, the aforementioned sampled signal element of +4.2 has been coded to a binary, 4-bit code "1010". Other input signal elements can be well treated in the similar way.

While the invention has been particularly shown and described with reference to several preferred embodiments thereof, it will be understood by those skilled in the art that various changes in form and details may be made therein without departing from the spirit and scope of the invention.

What we claim is:

1. A coder for the conversion of PAM-input signals into corresponding PCM-output reflected binary codes employing a predetermined number of bits wherein the first bit denotes the sign of the encoded input signal, comprising an input terminal for receiving sampled analog input signals, a plurality of signal processing stages the number of which corresponds to the number of said bits, a plurality of output terminals equal in number to said bits and connected to respective ones of said signal processing stages, the first one of said stages comprising a polarity discriminator connected between said input terminal and its corresponding output terminal, and each of said remaining stages comprising a polarity discriminator connected between the series connection of a rectifier circuit and a biasing circuit and its corresponding output terminal, said rectifier circuits being connected to receive from its preceding stage signals which are supplied to the polarity discriminator of said preceding stage, and each of said rectifier circuits comprising a transistor having a base electrode, a collector electrode and an emitter electrode, a series-connected Zener diode and normal diode connected between the collector electrode and a common output junction, and a second normal diode connected between the emitter electrode and the common output junction.

2. A coder as set forth in claim 1, wherein said biasing circuit comprises an adder-amplifier, having additionally an amplifying performance for matching the signal voltage under processing in advance of the circuit in the same stage with the sensitivity of the related discriminator.

3. A coder as set forth in claim 1, wherein each of said polarity discriminators comprise an AND-gate and a blocking oscillator, said discriminator being under the control of a timing signal which is in synchronism with those which are used in sampling the analog input signals.

4. A coder as set forth in claim 1, further including an attenuator inserted between said biasing circuit and said polarity discriminator, for matching the signal voltage being processed with the sensitivity of said discriminator.

5. A coder as set forth in claim 1, further including a buffer amplifier inserted in advance of said polarity discriminator, for the separation of the latter from a next succeeding stage.

References Cited

UNITED STATES PATENTS

| | | | |
|---|---|---|---|
| 2,541,039 | 2/1951 | Cole | 340—347 |
| 3,035,258 | 5/1962 | Chasek | 340—347 |
| 3,041,469 | 6/1962 | Ross | 340—347 |
| 3,161,868 | 12/1964 | Waldhauer | 340—347 |
| 3,187,325 | 6/1965 | Waldhauer | 340—347 |
| 3,216,005 | 11/1965 | Hoffman et al. | 340—347 |
| 3,219,997 | 11/1965 | Lewyn | 340—347 |
| 3,225,347 | 12/1965 | Doyle | 340—347 |
| 3,284,794 | 11/1966 | Bean | 340—347 |

MAYNARD R. WILBUR, Primary Examiner
CHARLES D. MILLER, Assistant Examiner